(No Model.)
B. M. HANNA.
EYEGLASSES OR SPECTACLES.
No. 306,918. Patented Oct. 21, 1884.
Fig. 1.
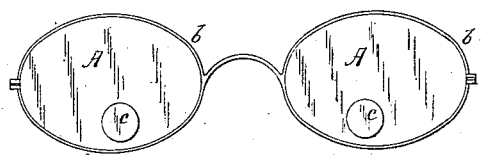
Fig. 2.  Fig. 4.  Fig. 3.
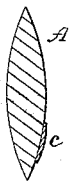  
Fig. 5
Witnesses:—
T. J. Patterson
F. A. Pollock
Benjamin M. Hanna
Inventor
Connolly Bros & McTighe
Attorneys.

UNITED STATES PATENT OFFICE.

BENJAMIN M. HANNA, OF PITTSBURG, PENNSYLVANIA.

EYEGLASSES OR SPECTACLES.

SPECIFICATION forming part of Letters Patent No. 306,918, dated October 21, 1884.

Application filed October 16, 1883. (No model.)

*To all whom it may concern:*

Be it known that I, BENJAMIN M. HANNA, of Pittsburg, in the county of Allegheny and State of Pennsylvania, have invented certain new and useful Improvements in Eyeglasses or Spectacles; and I do hereby declare that the following is a full, clear, and exact description of the invention, which will enable others skilled in the art to which it appertains to make and use the same, reference being had to the accompanying drawings, which form a part of this specification, in which—

Figure 1 shows a pair of spectacles with my improvement. Figs. 2, 3, 4, and 5 are sections of a lens with modifications of my improvement.

For many persons who use spectacles or eyeglasses it is necessary, besides the ordinary glasses, to have a pair adapted especially for reading, as the focal length for the latter purpose is altogether too short for seeing at a distance. It has been attempted to surmount this difficulty and the inconvenience of carrying two pairs of glasses by constructing each eye-piece of two separate semi-lenses set in one frame in the same plane, the dividing-line being horizontal and about the middle of the eye-piece. This, however, necessitates an inconvenient movement of the wearer's head in using the glasses, and only partially meets the requirements. I have observed that in all ordinary reading, when the print is held at a normal distance from the eyes, the movement of the eye in scanning the lines is very slight, probably never exceeding one-eighth of an inch. Where the book or printed line is very wide, the reader instinctively assists the movement of the eye by a corresponding movement of the head. Taking advantage of this fact, I have devised eyeglasses or spectacles of the desired dual character in a very simple manner.

The invention, briefly, consists in making the eyeglass or lens so as to adapt it to long-distance vision, and at a point preferably below the center, constructing the eyeglass with a small lens adapted for reading or close vision, said small lens being wholly within the edges of the other lens; and the invention further consists in an eyeglass-lens constructed substantially as hereinafter fully described and claimed.

In the drawings, A A designate the eyeglasses, set in any suitable frame or holder, *b*, such glasses being formed and adapted to seeing distant objects. At a point on each of the glasses A, preferably below the center and toward the nose-piece, as shown in Fig. 1, I form or place a small lens, *c*, especially adapted to seeing near objects or reading. Located thus the small lenses *c* are a little below but in front of the pupil when it is in position for horizontal vision, so that by slightly lowering the pupils, as is naturally done in reading, the lines of sight are slightly convergent and through the small lenses *c*, and in this way a book or other print may be read without any effort to hold the head in any particular position, and without any undue strain upon the muscles or nerves of the eye. The range of motion of the eye in scanning the lines is, as stated, so small that a lens one-fourth of an inch diameter will be found more than enough to allow of distinct vision through quite a wide angle without aberration. For all long-sight purposes the construction is such that there is some part of the large lens on every side of the small reading-lens, as the latter is wholly within the area of the large lens, and therefore, when reading a near object, the slightest movement of the pupil in any direction vertically or horizontally beyond the limits of the small lens at once brings the line of vision through the principal lens. In constructing such eyeglasses the short-focus lenses *c* may be cemented on the long-focus lenses, as in Fig. 2; or they may be formed in the original operation of grinding, as in Fig. 3, or by subsequent grinding, as in Fig. 4; or the lenses A may be bored out and the lenses *c* inserted with cement, as in Fig. 5. I therefore do not confine my invention to any particular mode of construction, as that will be best determined by the circumstances of individual taste, conditions of use, relative cost, or the fancy of the maker. Likewise the form of the lens may vary. It may be circular, as in Fig. 1, or semicircular or other suitable shape. Obviously it is applicable to all ordinary forms of lenses, whether double convex, periscopic convex, double concave, periscopic concave, or other form. I have shown double convex as a matter of convenience simply in illustrating the invention.

It will be observed that by use of my construction the wearer can use the long-distance lens in all directions above or below or on either side of the short-distance lens—a result which in compound eyeglasses has not hitherto been accomplished.

I claim as my invention—

1. An eyeglass-lens substantially complete, having a small supplemental lens of different focal length or power formed therein or attached thereto, and located wholly within the edges of said eyeglass-lens, substantially as described.

2. An eyeglass or spectacle lens substantially complete, having formed therein or attached thereto a small supplemental lens of different focal power, having its center located at a point outside the vertical axis of said principal lens, substantially as described.

3. An eyeglass or spectacle lens substantially complete, having formed therein or attached thereto a small supplemental lens of different focal power, having its center located at a point below the horizontal and to one side of the vertical axis of the said principal lens, substantially as described.

4. An eyeglass or spectacle having two principal lenses, each provided with a small supplemental lens of different focal power, so situated with respect to the eye of the wearer as to be in the line of vision only when the eyes are convergently directed, as in reading, substantially as described.

In testimony that I claim the foregoing as my own I have hereto affixed my signature in presence of two witnesses.

BENJAMIN M. HANNA.

Witnesses:
D. E. DAVIS.
T. J. McTIGHE.